United States Patent
Misawa et al.

(10) Patent No.: US 8,437,602 B2
(45) Date of Patent: May 7, 2013

(54) INFORMATION PROCESSING APPARATUS AND PROGRAM

(75) Inventors: Junichiro Misawa, Tokyo (JP); Kenji Ishimatsu, Kanagawa (JP); Kikuo Kotake, Kanagawa (JP); Sumio Otsuka, Tokyo (JP); Hidekazu Kamon, Kanagawa (JP); Kenichi Matsumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 948 days.

(21) Appl. No.: 12/533,790

(22) Filed: Jul. 31, 2009

(65) Prior Publication Data

US 2010/0054709 A1    Mar. 4, 2010

(30) Foreign Application Priority Data

Sep. 1, 2008    (JP) ................................. 2008-224001

(51) Int. Cl.
*H04N 5/775*    (2006.01)

(52) U.S. Cl.
USPC ......................................................... 386/230

(58) Field of Classification Search .................... None
See application file for complete search history.

(56) References Cited

U.S. PATENT DOCUMENTS 7,916,131 B2 * 3/2011 Chiu .............................. 345/211
2006/0093153 A1 * 5/2006 Yamamoto et al. ............. 381/59

FOREIGN PATENT DOCUMENTS

JP    2007-108198    4/2007

* cited by examiner

*Primary Examiner* — Gelek W Topgyal
(74) *Attorney, Agent, or Firm* — Oblon, Spivak, McClelland, Maier & Neustadt, L.L.P.

(57) ABSTRACT

An information processing apparatus is provided that includes a control unit to execute an operating system and selectively output a first video signal or both the first video signal and a first audio signal, an external input unit to which an external content signal containing a second video signal and a second audio signal transmitted from an external apparatus is input, and a reproduction state switch control unit to selectively switch a first reproduction state for reproducing the first video signal or both the first video signal and the first audio signal, and a second reproduction state for reproducing the second video signal and the second audio signal, wherein, if input of the external content signal to the external input unit is detected during a reproduction standby state, the reproduction state switch control unit switches the reproduction standby state with the second reproduction state.

13 Claims, 7 Drawing Sheets

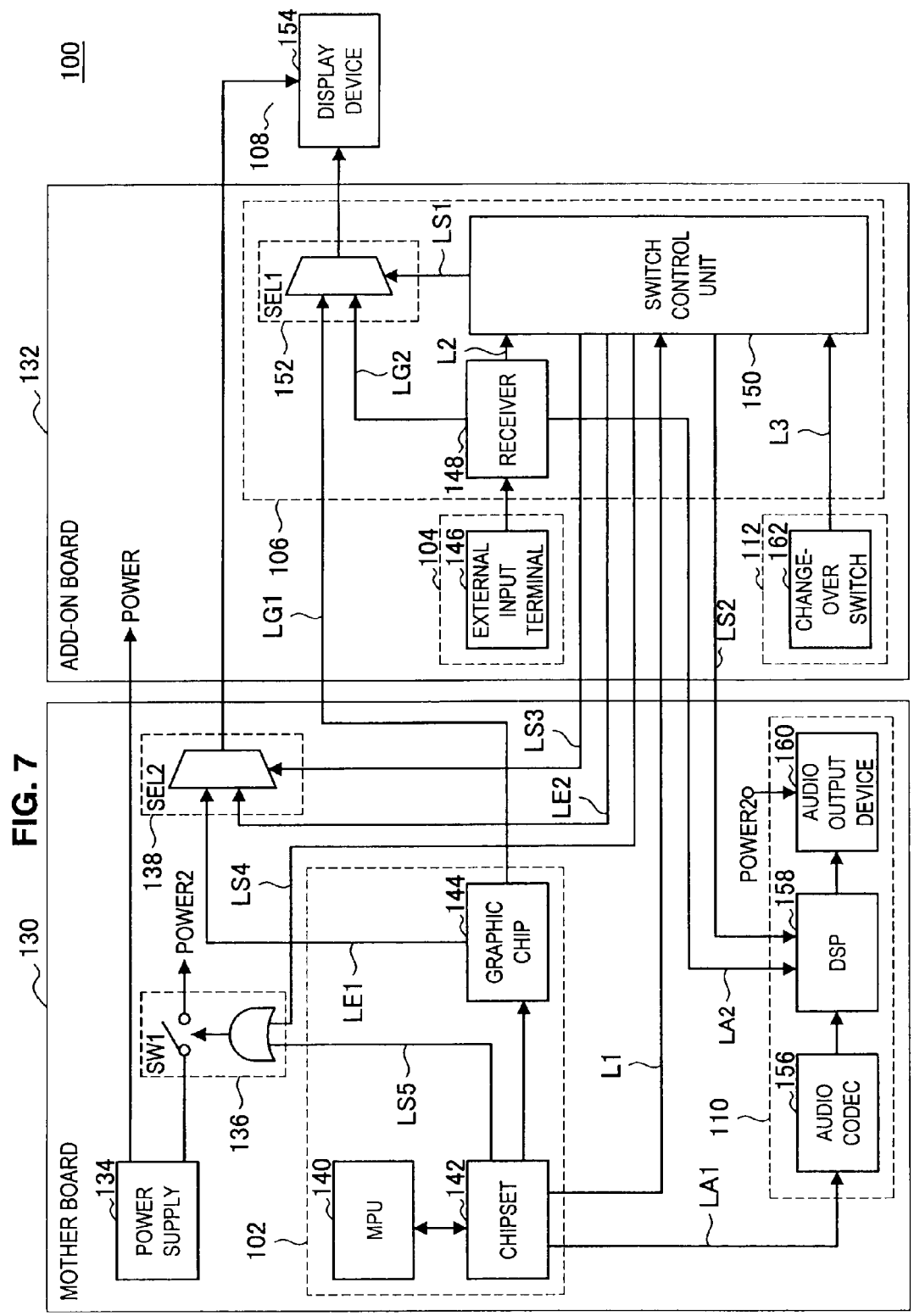

INFORMATION PROCESSING APPARATUS AND PROGRAM

BACKGROUND OF THE INVENTION

1. Field of the Invention

The present invention relates to an information processing apparatus and a program.

2. Description of the Related Art

Various kinds of information processing apparatus such as computers like PC (Personal Computers) and navigation apparatus mounted on cars or the like (so-called car navigation apparatus) have become increasingly multifunctional and become highly functional recently. Some of such information processing apparatus include an external input terminal to be connected to an external apparatus and have a function of reproducing a video indicated by a video signal and a sound indicated by an audio signal both transmitted from the external apparatus on the information processing apparatus. Further, HDMI (High-Definition Multimedia Interface) is becoming widespread as an interface for connecting the information processing apparatus and the external apparatus.

The HDMI is a communication interface that transmits a non-compressed digital video signal and a digital audio signal accompanying the video signal. Specifically, a TMDS (Transition Minimized Differential Signaling) channel, a CEC (Consumer Electronics Control) line or the like is compliant to the HDMI specification. The TMDS channel is a transmission path that transmits signals in one direction from the HDMI source to the HDMI sink. The CEC line is a transmission path that transmits and receives various kinds of control signals bidirectionally between the HDMI source and the HDMI sink. In this structure, the HDMI can transmit and receive digital video signals, digital audio signals and various kinds of control signals through one cable. Further, because the HDMI can transmit and receive various kinds of control signals between the HDMI source and the HDMI sink through the CEC line, interaction between equipment is possible.

In such a background, a technique of establishing interaction between connected equipment has been developed. For example, Japanese Unexamined Patent Publication No. 2007-108198 discloses a technique that, in an information processing apparatus and a display apparatus connected by the HDMI, the information processing apparatus acquires format information of an audio signal from the display apparatus and sets the audio signal to be output to the display apparatus according to the acquired format information.

SUMMARY OF THE INVENTION

However, an information processing apparatus to which the hitherto known technique of establishing interaction between connected equipment (which is referred to as "related art" in some cases below) is unable to establish interaction unless it acquires audio format information from a display apparatus. If equipment are connected by the HDMI as in related art, it is necessary to perform communication through the CEC line, for example, in order to acquire audio format information. However, not all of HDMI connectable apparatus can perform two-way communication through the CEC line. Therefore, if related art is applied to an apparatus that is not compatible with communication through the CEC line, interaction is not established between connected equipment.

Further, as described earlier, an information processing apparatus such as a PC or a navigation apparatus has been proposed that includes an external input terminal to be connected to an external apparatus and has a function of reproducing a video indicated by a video signal and a sound indicated by an audio signal both transmitted from the external apparatus on the information processing apparatus. The term "reproduction" means displaying a video on a display device or outputting a sound from an audio output device, for example. However, the information processing apparatus as described above is unable to perform any function unless an operating system (OS), which is one of basic software related to hardware control, for example, is activated (executed). Therefore, in order to reproduce a video and a sound according to a video signal or an audio signal output from the external apparatus in the information processing apparatus, it is necessary for a user of the information processing apparatus to wait until the OS is activated, which significantly decreases user-friendliness (or so-called usability).

In light of the foregoing, it is desirable to provide a novel and improved information processing apparatus and program that enable reproduction of a video and a sound indicated by a signal transmitted from an external apparatus without depending on an execution state of an operating system and thereby allows improvement of user-friendliness.

According to an embodiment of the present invention, there is provided an information processing apparatus which includes a control unit to execute an operating system and selectively output a first video signal indicating a video or both the first video signal and a first audio signal indicating a sound based on execution of the operating system, an external input unit to which an external content signal containing a second video signal indicating a video and a second audio signal indicating a sound transmitted from an external apparatus is input, and a reproduction state switch control unit to selectively switch a first reproduction state for reproducing the first video signal or both the first video signal and the first audio signal, and a second reproduction state for reproducing the second video signal and the second audio signal when a video signal and an audio signal are to be reproduced, wherein, if input of the external content signal to the external input unit is detected during a reproduction standby state that is not any of the first reproduction state and the second reproduction state, the reproduction state switch control unit switches the reproduction standby state with the second reproduction state.

In this configuration, it is possible to reproduce a video and a sound indicated by a signal transmitted from an external apparatus without depending on the execution state of the operating system, thereby improving user-friendliness.

The control unit may generate an activation signal indicating execution of the operating system upon execution of the operating system, and the reproduction state switch control unit may include an external content signal detection unit to detect the external content signal input to the external input unit, a state change determination unit to determine a change in the reproduction state based on reproduction state information indicating reproduction state related to reproduction of a video signal and an audio signal, the activation signal, and a detection result in the external content signal detection unit, and a reproduction processing switching unit to selectively switch the first reproduction state and the second reproduction state based on a determination result of the state change determination unit.

The state change determination unit may determine a change in the reproduction state based further on the first video signal.

The second video signal contained in the external content signal may include a plurality of color signals and a clock signal for synchronizing the color signals, and the external content signal detection unit may detect input of the external content signal based on a change in clock of the clock signal.

The information processing apparatus may further include a switch input unit to generate a switch signal for switching the first reproduction state and the second reproduction state based on operation input, and the reproduction processing switching unit may switch the first reproduction state and the second reproduction state based on the switch signal transferred from the switch input unit.

The control unit may generate an activation signal indicating execution of the operating system upon execution of the operating system, and if the activation signal transferred from the control unit is detected during the reproduction standby state, the reproduction state switch control unit may switch the reproduction standby state with the first reproduction state.

The information processing apparatus may further include an audio output unit to receive at least one of the first audio signal output from the control unit and the second audio signal contained in the external content signal and selectively output a sound indicated by the first audio signal or the second audio signal, and the reproduction state switch control unit may transfer an audio switch control signal to the audio output unit upon switching to the second reproduction state, and the audio output unit may selectively output the second audio signal when the audio switch control signal is transferred.

The audio output unit may include an amplifier to amplify the first audio signal or the second audio signal to be selectively output based on a transferred power supply voltage, the information processing apparatus may further include a power supply to output the power supply voltage to be supplied to the audio output unit and a switching unit to selectively transfer the power supply voltage to the amplifier based on a transferred power supply signal, and the reproduction state switch control unit may output a first power supply signal for selectively transferring the power supply voltage to the amplifier to the switching unit upon switching to the second reproduction state.

The control unit may output a second power supply signal for selectively transferring the power supply voltage to the amplifier to the switching unit upon execution of the operating system, and the switching unit may include an OR-circuit to output a power supply signal having a signal level for selectively transferring the power supply voltage to the amplifier upon input of at least one of the first power supply signal and the second power supply signal, and a switching element to selectively transfer the power supply voltage to the amplifier based on the power supply signal output from the OR-circuit.

According to another embodiment of the present invention, there is provided an information processing apparatus which includes a control unit to execute an operating system and selectively output a first video signal indicating a video or both the first video signal and a first audio signal indicating a sound based on execution of the operating system, an external input unit to which a third video signal indicating a video and a third audio signal indicating a sound transmitted from an external apparatus are input, and a reproduction state switch control unit to selectively switch a first reproduction state for reproducing the first video signal or both the first video signal and the first audio signal, and a third reproduction state for reproducing at least one of the third video signal and the third audio signal when a video signal and an audio signal are to be reproduced, wherein, if input of the third video signal or the third audio signal to the external input unit is detected during a reproduction standby state that is not any of the first reproduction state and the third reproduction state, the reproduction state switch control unit switches the reproduction standby state with the third reproduction state.

In this configuration, it is possible to reproduce a video and a sound indicated by a signal transmitted from an external apparatus without depending on the execution state of the operating system, thereby improving user-friendliness.

According to another embodiment of the present invention, there is provided a program causing a computer to execute the steps of detecting an external content signal input to an external input unit to which the external content signal containing a second video signal indicating a video and a second audio signal indicating a sound is input, determining a change in state related to reproduction of a video signal and an audio signal based on reproduction state information indicating reproduction state related to reproduction of a video signal and an audio signal, an activation signal transferred from a control unit that executes an operating system and generates the activation signal indicating execution of the operating system, and a detection result in the detecting step, and selectively switching a first reproduction state for reproducing a first video signal indicating a video or both the first video signal and a first audio signal indicating a sound output from the control unit, and a second reproduction state for reproducing the second video signal and the second audio signal based on a determination result in the determining step.

With use of the above program, it is possible to reproduce a video and a sound indicated by a signal transmitted from an external apparatus without depending on the execution state of the operating system, thereby improving user-friendliness.

According to the embodiments of the present invention described above, it is possible to reproduce a video and a sound indicated by a signal transmitted from an external apparatus without depending on an execution state of an operating system and thereby improve user-friendliness.

BRIEF DESCRIPTION OF THE DRAWINGS

FIG. 7 is an explanatory view showing an example of the hardware configuration of an information processing apparatus according to an embodiment of the present invention.

DETAILED DESCRIPTION OF THE PREFERRED EMBODIMENTS

Figure 1:
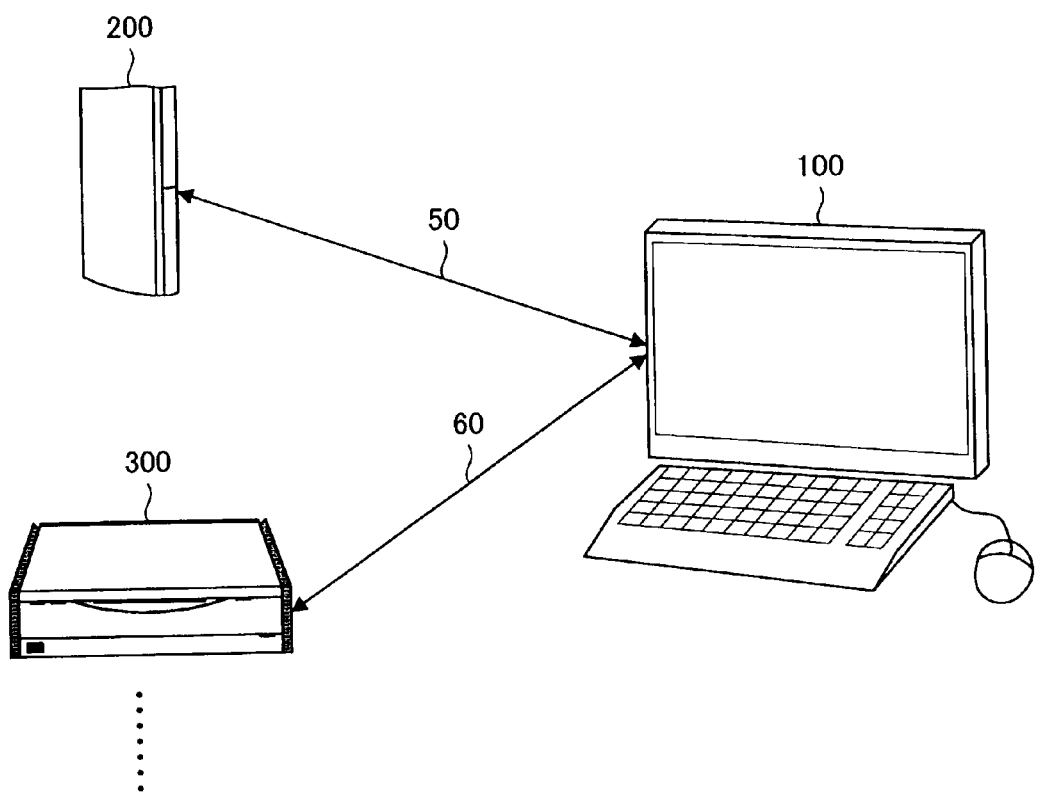
FIG. 1 is an explanatory view to describe the outline of an information processing system according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be given in the following order.
1. Approach according to an embodiment of the present invention.
2. Information processing apparatus according to an embodiment of the present invention.
3. Program according to an embodiment of the present invention.

Approach According to an Embodiment of the Present Invention

Before describing the configuration of an information processing apparatus according to an embodiment of the present invention, an approach to improve user-friendliness in an information processing apparatus (which is referred to hereinafter as an "information processing apparatus 100") according to an embodiment of the present invention is described below.

[1] Outline of an Information Processing System

First, the outline of an information processing system (which is referred to hereinafter as an "information processing system 1000") according to an embodiment of the present invention is described hereinbelow. FIG. 1 is an explanatory view to describe the outline of the information processing system 1000 according to the embodiment of the present invention.

Referring to FIG. 1, the information processing system 1000 includes content signal transmitting apparatus (external apparatus; denoted by the symbols 200, 300 . . . in FIG. 1) that transmit a content signal and the information processing apparatus 100 that reproduces a video and a sound based on an input (or received) content signal. The content signal transmitting apparatus 200, 300 . . . (which are collectively referred to as a "content signal transmitting apparatus 200" in some cases below) and the information processing apparatus 100 are connected by a communication interface 50, 60 . . . . The term "connection" in the embodiment of the present invention means being a state where communication is possible between apparatus (or setting a state where communication is possible between apparatus). The content signal transmitting apparatus 200 and the information processing apparatus 100 can be connected via wireless or wired.

The content signal is a signal that contains a video signal indicating a video and an audio signal indicating a sound, for example. Hereinafter, the content signal transmitted from the content signal transmitting apparatus 200 is referred to as an "external content signal", and a video signal contained in the external content signal is referred to as a "second video signal", and an audio signal contained in the external content signal is referred to as a "second audio signal". Further, the video signal according to the embodiment of the present invention may be a signal indicating a still image or a signal indicating a moving image. The content signal according to the embodiment of the present invention may be a signal containing either one of the video signal or the audio signal.

Although the communication interface 50, 60 . . . in the information processing system 1000 may the HDMI (or wireless HDMI) capable of transmitting both a digital video signal and a digital audio signal accompanying the video signal, for example, it is not limited thereto. For example, in the information processing system 1000, apparatus may be connected by communication interfaces that separately transmit the video signal and the audio signal, such as a communication interface using a D-terminal and a communication interface using an optical digital audio terminal. In the following description, the HDMI is used as an example of the communication interface 50, 60 . . . . The video signal and the audio signal according to the embodiment of the present invention are not limited to a digital signal, and they may be an analog signal.

If the communication interface 50, 60 . . . is the HDMI, the content signal transmitting apparatus 200 corresponds to the HDMI source side, and the information processing apparatus 100 corresponds to the HDMI sink side in the information processing system 1000.

The content signal transmitting apparatus 200 transmits the external content signal. Specifically, the content signal transmitting apparatus 200 decodes video data read out of a storage unit (not shown) or an external recording medium (not shown), for example, and audio data accompanying the video data in a prescribed scheme. The prescribed scheme may be MPEG (Moving Picture Experts Group) or the like, for example. The content signal transmitting apparatus 200 transmits a baseband video signal (video signal according to a video indicated by the video data) and an audio signal (audio signal according to a sound indicated by the audio data) to the information processing apparatus 100 via the HDMI source (not shown), for example. The HDMI source (not shown) transmits the baseband video signal and audio signal one-way to the information processing apparatus 100 via differential signals of a plurality of channels by the communication compliant to the HDMI specification. Thus, the HDMI source (not shown) serves as a transmitting unit in the content signal transmitting apparatus 200

The content signal transmitting apparatus 200 may be a computer such as a PC, a disc playback apparatus such as a Blu-ray (registered trademark) disc player (or a Blu-ray (registered trademark) disc recorder) or a DVD recorder, or a game machine such as a Playstation (registered trademark) series, for example, although not limited thereto.

The information processing apparatus 100 switches among three states related to reproduction of the video signal and the audio signal: a first reproduction state, a second reproduction state and a reproduction standby state (which are collectively referred to hereinafter as a reproduction state), for example.

The first reproduction state is a reproduction state in which only the video signal or both the video signal and the audio signal are reproduced based on an OS being executed. A video that is reproduced in the first reproduction state may be a basic operation screen (so-called "desktop screen") that is displayed on a display screen by the execution of an OS, a screen that is displayed by application software operating on an OS or the like, for example, although not limited thereto. Further, a sound that is reproduced in the first reproduction state may be a sound that is output in response to user operation on the operation screen, a sound that is reproduced upon execution of the application software (e.g. a sound accompanying reproduction of video data) or the like, for example. The video signal and the audio signal in the first reproduction state may be a signal that is obtained by decoding content data recorded in a storage unit (which is described later) or an external recording medium (not shown), for example, although not limited thereto. Hereinafter, the video signal related to the first reproduction state is referred to as a "first video signal, and the audio signal related to the first reproduction state is referred to as a "first audio signal.

The second reproduction state is a reproduction state in which the second video signal or the second audio signal based on the input external content signal are reproduced. The information processing apparatus 100 implements the second reproduction state without depending on whether an OS is activated (executed) or not (which is described later).

The reproduction standby state is a reproduction state that does not correspond to any of the first reproduction state and the second reproduction state. The reproduction standby state may be a standby state in which an OS of the information processing apparatus 100 is not activated and the external content signal is not input, for example.

The information processing apparatus 100 selectively switches among the above three reproduction states as in the following (a) to (d), for example. Hereinafter, "switching of reproduction state" is referred to as "transition of reproduction state" (or simply as "transition") in some cases.

(a) Transition from the Reproduction Standby State to the First Reproduction State The information processing apparatus 100 activates an OS when user's pressing of a power button is detected during the reproduction standby state, for example. By the activation of the OS, the information processing apparatus 100 makes transition from the reproduction standby state to the first reproduction state.

(b) Transition from the Reproduction Standby State to the Second Reproduction State The information processing apparatus 100 makes transition to the second reproduction state without activating the OS when the external content signal is transmitted from the content signal transmitting apparatus 200 during the reproduction standby state, for example.

(c) Transition Between the First Reproduction State and the Second Reproduction State The information processing apparatus 100 switches between the first reproduction state and the second reproduction state when user's operation of a switch device (e.g. a switch button) is detected, for example.

(d) Transition from the First Reproduction State/the Second Reproduction State to the Standby State The information processing apparatus 100 waits for a prescribed wait time when the video signal ceases to be input in the first reproduction state/the second reproduction state, for example. Then, if the video signal is not input after a lapse of the prescribed time, the information processing apparatus 100 makes transition to the reproduction standby state.

The information processing apparatus 100 switches the reproduction state as described in the above (a) to (d), for example. The conditions for switching the reproduction state according to an embodiment of the present invention, however, are not limited to those described in the above (a) to (d). As described in the above (b), the information processing apparatus 100 makes transition from the reproduction standby state to the second reproduction state without activating the OS. Therefore, a user of the information processing apparatus 100 can enjoy the video and the sound indicated by the external content signal without waiting until the OS is activated. Further, because the information processing apparatus 100 can switch between the first reproduction state and the second reproduction state without once making transition to the reproduction standby state as described in the above (c), it is possible to selectively switch between the video indicated by the first video signal and the video indicated by the second video signal, for example. Thus, the information processing apparatus 100 can reproduce the video and the sound based on the external content signal that is output from the content signal transmitting apparatus 200 without depending on the execution state of the OS. The information processing apparatus 100 can thereby allows improvement of user-friendliness.

In the above configuration, for example, the information processing apparatus 100 can reproduce the video or the audio based on the external content signal that is output from the content signal transmitting apparatus 200, 300, . . . in an interacting manner in the information processing system 1000.

[2] Approach to Improve User-Friendliness in the Information Processing Apparatus 100

An approach to improve user-friendliness in the information processing apparatus 100 according to the embodiment of the present invention is described hereinafter. The information processing apparatus 100 performs the following processing (1) and (2), for example, in order to implement switching of the reproduction state as described in the above (a) to (d) and thereby improve user-friendliness.

(1) Processing of Determining a Change in Reproduction State

The information processing apparatus 100 determines a change in reproduction state based on the current reproduction state, an activation signal, a detection signal (detection result) based on input of the external content signal, the first video signal and a switch signal, for example.

The information processing apparatus 100 recognizes the current reproduction state based on information indicated by reproduction state information that represents the current reproduction state, for example. The information processing apparatus 100 can recognize the current reproduction state by updating the reproduction state information to information indicating the reproduction state after transition each time the reproduction state transitions, for example. The reproduction state information may be information in which the first reproduction state, the second reproduction state and the reproduction standby state are represented by two bits, for example, although not limited thereto. A method of recognizing the current reproduction state in the information processing apparatus 100 according to an embodiment of the present invention is not limited to the above method of using the reproduction state information.

The activation signal is a signal that is generated based on the execution of the OS (in a control unit 102, which is described later), for example. The activation signal is generated upon activation of the OS, for example. The activation signal according to an embodiment of the present invention, however, is not limited thereto, and it may be generated continuously (or periodically or non-periodically) during the execution of the OS. By detecting the activation signal, the information processing apparatus 100 can recognize that reproduction in the first reproduction state is possible. Further, the information processing apparatus 100 according to an embodiment of the present invention is not limited to generate the activation signal based on the execution of the OS. For example, the information processing apparatus 100 may generate the activation signal based on the execution of BIOS (Basic Input/Output System). Thus, the activation signal according to an embodiment of the present invention can be regarded as being a signal that is generated based on the execution of basic software.

The detection signal is a signal (detection result) that indicates detection of the external content signal. By detecting the detection signal, the information processing apparatus 100 can recognize that reproduction in the second reproduction state is possible. The switch signal is a signal that is generated based on user input (in a switch input unit 112, which is described later). By detecting the switch signal, the information processing apparatus 100 can recognize that a user wishes to switch between the first reproduction state and the second reproduction state, for example.

An example of a method of determining a change in reproduction state in the information processing apparatus 100 is described hereinafter more specifically.

(1-1) Determination of a Change from the Reproduction Standby State

When the activation signal is detected during the reproduction standby state, the information processing apparatus 100 determines that a change has occurred from the reproduction standby state to the first reproduction state. Further, when the detection signal is detected during the reproduction standby state, the information processing apparatus 100 determines that a change has occurred from the reproduction standby state to the second reproduction state.

(1-2) Determination of a Change from the First Reproduction State

When the first video signal ceases to be detected during the first reproduction state, the information processing apparatus 100 waits for a prescribed wait time. Then, if the first video signal is not detected after a lapse of the prescribed wait time, the information processing apparatus 100 determines that the reproduction state has changed from the first reproduction state. The first video signal is a video signal related to the first reproduction state as described earlier. For example, when the OS is executed, the first video signal that indicates a basic operation screen (so-called "desktop screen") to be displayed on the display screen by the execution of the OS exists in the information processing apparatus 100. Thus, the information processing apparatus 100 can determine whether display of the video in the first reproduction state is possible or not by detecting the presence or absence of the first video signal. Accordingly, the information processing apparatus 100 can determine that the reproduction state has changed from the first reproduction state by detecting the presence or absence of the first video signal.

A signal that is used for determination of a change from the first reproduction state in the information processing apparatus 100 is not limited to the first video signal. For example, the information processing apparatus 100 may determine a change from the first reproduction state based on the activation signal if it is generated continuously (or periodically or non-periodically) during the execution of the OS. Hereinafter, the case where the information processing apparatus 100 performs the above processing (1-2) based on the first video signal is described by way of illustration.

(1-3) Determination of a Change from the Second Reproduction State

When the detection signal ceases to be detected during the second reproduction state, the information processing apparatus 100 waits for a prescribed wait time. Then, if the detection signal is not detected after a lapse of the prescribed wait time, the information processing apparatus 100 determines that the reproduction state has changed from the second reproduction state.

(1-4) Determination of a Change Based on the Switch Signal

When the switch signal is detected, the information processing apparatus 100 determines that a change in reproduction state has occurred.

(2) Processing of Switching Reproduction State

The information processing apparatus 100 selectively makes transition of the reproduction state as described in the following (2-1) to (2-4), for example, according to a determination result in the above processing (1).

(2-1) Transition from the Reproduction Standby State

If it is determined in the above determination (1-1) that a change has occurred from the reproduction standby state to the first reproduction state, the information processing apparatus 100 reproduces the video based on the first video signal and the sound based on the first audio signal. When the first audio signal does not exist, for example, the information processing apparatus 100 can of course reproduce only the video based on the first video signal.

On the other hand, if it is determined in the above determination (1-1) that a change has occurred from the reproduction standby state to the second reproduction state, the information processing apparatus 100 reproduces the video based on the second video signal and the sound based on the second audio signal without activating the OS. An exemplary configuration for implementing the second reproduction state without activating the OS in the information processing apparatus 100 is described later. When the second video signal or the second audio signal does not exist, for example, the information processing apparatus 100 can reproduce either one of the video based on the second video signal or the sound based on the second audio signal.

(2-2) Transition from the First Reproduction State

If it is determined in the above determination (1-2) that a change has occurred from the first reproduction state, the information processing apparatus 100 determines a reproduction state to transition based on a detection result of the detection signal, for example. For example, if the detection signal is detected in the above case, the information processing apparatus 100 makes transition to the second reproduction state (which is the same processing as "return processing" described later). If, on the other hand, the detection signal is not detected in the above case, the information processing apparatus 100 makes transition to the reproduction standby state (timeout).

(2-3) Transition from the Second Reproduction State

If it is determined in the above determination (1-3) that a change has occurred from the second reproduction state, the information processing apparatus 100 determines a reproduction state to transition based on a detection result of the first video signal, for example. For example, if the first video signal is detected in the above case, the information processing apparatus 100 makes transition to the first reproduction state (which is the same processing as "return processing" described later). If, on the other hand, the first video signal is not detected in the above case, the information processing apparatus 100 makes transition to the reproduction standby state (timeout).

(2-4) Transition Based on Detection of the Switch Signal

If it is determined in the above determination (1-4) that the switch signal is detected, the information processing apparatus 100 determines a reproduction state to transition based on the current reproduction state. For example, if the current reproduction state is the first reproduction state, the information processing apparatus 100 makes transition to the second reproduction state. If, on the other hand, the current reproduction state is the second reproduction state, the information processing apparatus 100 makes transition to the first reproduction state. Further, if the current reproduction state is the reproduction standby state, the information processing apparatus 100 does not make transition of the reproduction state. The information processing apparatus 100 can recognize the current reproduction state based on the stored reproduction state information, for example, although not limited thereto.

Further, in the case where reproduction in the reproduction state after transition is not available when transition is made between the first reproduction state and the second reproduction state based on the detection of the switch signal, the information processing apparatus 100 makes transition to the original reproduction state (return processing). By performing the return processing in this manner, even if a user wrongly performs switch operation, for example, the video is displayed on the display screen. The information processing apparatus 100 can thereby improve user-friendliness by performing the return processing as described above.

Figure 2:
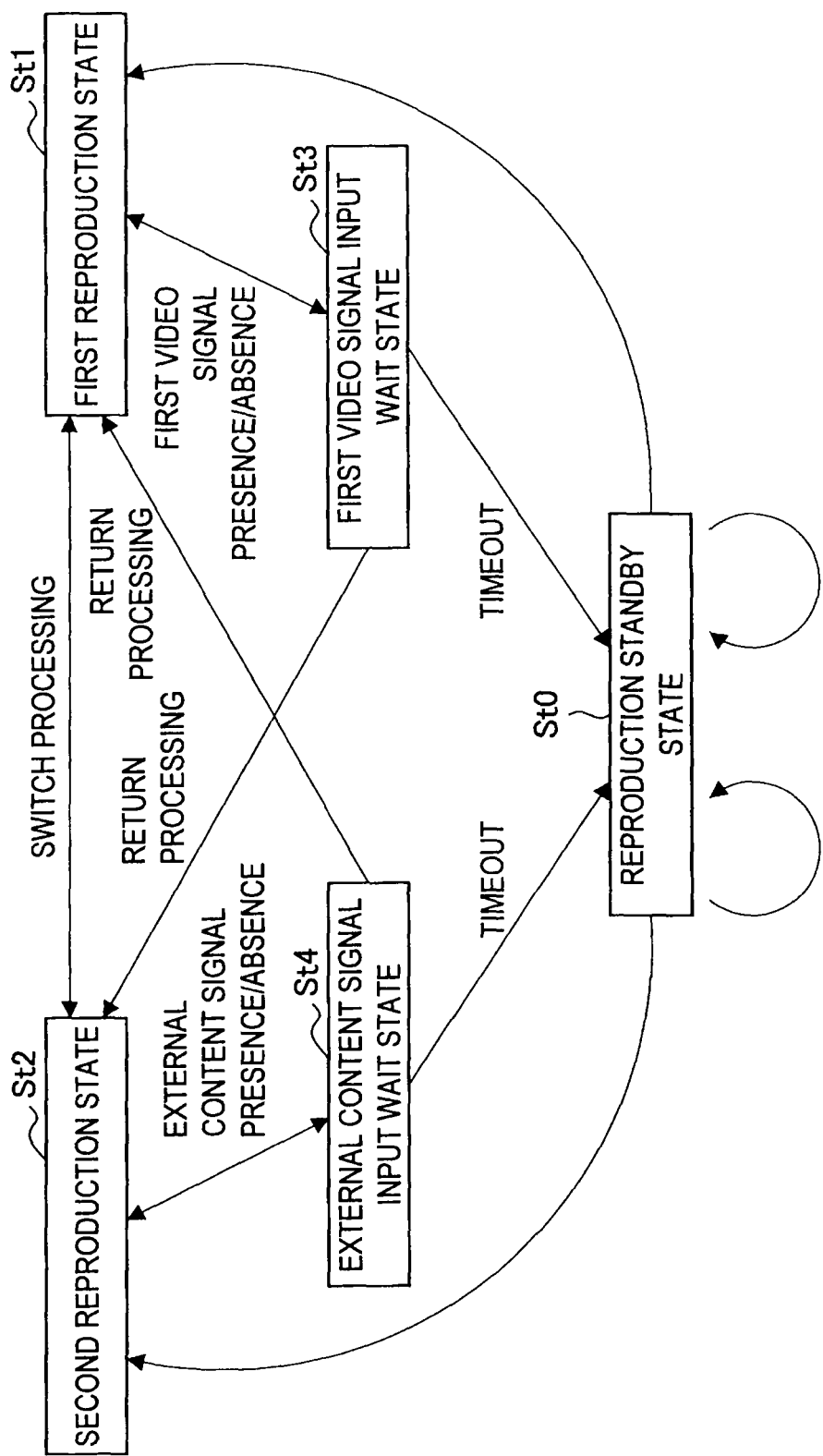
FIG. 2 is an explanatory view showing an example of transition of reproduction state in an information processing apparatus according to an embodiment of the present invention.

The information processing apparatus 100 selectively makes transition of the reproduction state by performing the above-described processing (2-1) to processing (2-4). FIG. 2 is an explanatory view showing an example of transition of the reproduction state in the information processing apparatus 100 according to the embodiment of the present invention. FIG. 2 illustrates each of the above-described processing (2-1) to processing (2-4). The above-described processing (2-1) to processing (2-4) are briefly described hereinafter with reference to FIG. 2.

<A> Processing (2-1)

If the activation signal is detected during the reproduction standby state St0, the information processing apparatus 100 makes transition to the first reproduction state St1. Further, if the detection signal is detected during the reproduction standby state St0, the information processing apparatus 100 makes transition to the second reproduction state St2. On the other hand, if none of the activation signal or the detection signal is detected during the reproduction standby state St0, the information processing apparatus 100 does not make transition to another reproduction state from the reproduction standby state St0.

<B> Processing (2-2)

If the first video signal is not detected during the first reproduction state St1, the information processing apparatus 100 makes transition to a first video signal input wait state St3. Then, the information processing apparatus 100 waits for a prescribed wait time. If the first video signal is detected again during the prescribed wait time, the information processing apparatus 100 makes transition from the first video signal input wait state St3 to the first reproduction state St1. On the other hand, if the first video signal is not detected during the prescribed wait time and the detection signal (i.e. the signal based on input of the external content signal) is detected, the information processing apparatus 100 makes transition from the first video signal input wait state St3 to the second reproduction state St2. If the first video signal is not detected during the prescribed wait time and the detection signal (i.e. the signal based on input of the external content signal) is not detected, the information processing apparatus 100 makes transition from the first video signal input wait state St3 to the reproduction standby state St0.

<C> Processing (2-3)

If the detection signal is not detected during the second reproduction state St2, the information processing apparatus 100 makes transition to an external content signal input wait state St4. Then, the information processing apparatus 100 waits for a prescribed wait time. If the detection signal is detected again during the prescribed wait time, i.e. if the external content signal is detected again, the information processing apparatus 100 makes transition from the external content signal input wait state St4 to the second reproduction state St2. On the other hand, if the detection signal is not detected during the prescribed wait time and the first video signal is detected, the information processing apparatus 100 makes transition from the external content signal input wait state St4 to the first reproduction state St1. If the detection signal is not detected during the prescribed wait time and the first video signal is not detected, the information processing apparatus 100 makes transition from the external content signal input wait state St4 to the reproduction standby state St0.

<D> Processing (2-4)

If the switch signal is detected during the first reproduction state St1, the information processing apparatus 100 makes transition to the second reproduction state St2. If reproduction in the second reproduction state St2 is not available, the state transitions back to the first reproduction state St1 through the external content signal input wait state St4 (return processing).

If the switch signal is detected during the second reproduction state St2, the information processing apparatus 100 makes transition to the first reproduction state St1. If reproduction in the first reproduction state St1 is not available, the state transitions back to the second reproduction state St2 through the first video signal input wait state St3 (return processing).

The information processing apparatus 100 can make transition of the reproduction state as shown in FIG. 2 based on the activation signal, the detection signal (detection result) based on input of the external content signal, the first video signal and the switch signal, for example.

The information processing apparatus 100 selectively switches the reproduction state by performing the above processing (1) (processing of determining change in reproduction state) and the processing (2) (processing of switching reproduction state), for example. The information processing apparatus 100 can thereby reproduce the video and the sound indicated by the external content signal (or implement the second reproduction state) without depending on the execution state of the OS, and it is thus possible to improve user-friendliness.

Further, because the information processing apparatus 100 selectively switches the reproduction state by performing the above processing (1) (processing of determining change in reproduction state) and the processing (2) (processing of switching reproduction state), it is not necessary to perform communication with the content signal transmitting apparatus 200 in order to switch the reproduction state. Therefore, in the information processing system 1000 that includes the information processing apparatus 100, it is not necessary that the apparatus constituting the information processing system has a particular function such as communication through the CEC line, unlike the information processing system that includes the information processing apparatus according to related art. The information processing apparatus 100 is thereby capable of interaction between apparatus that are connected by a general-purpose interface compared to the information processing apparatus according to related art.

[3] Specific Example of Processing Related to Switching of Reproduction State in the Information Processing Apparatus 100

Figure 3:
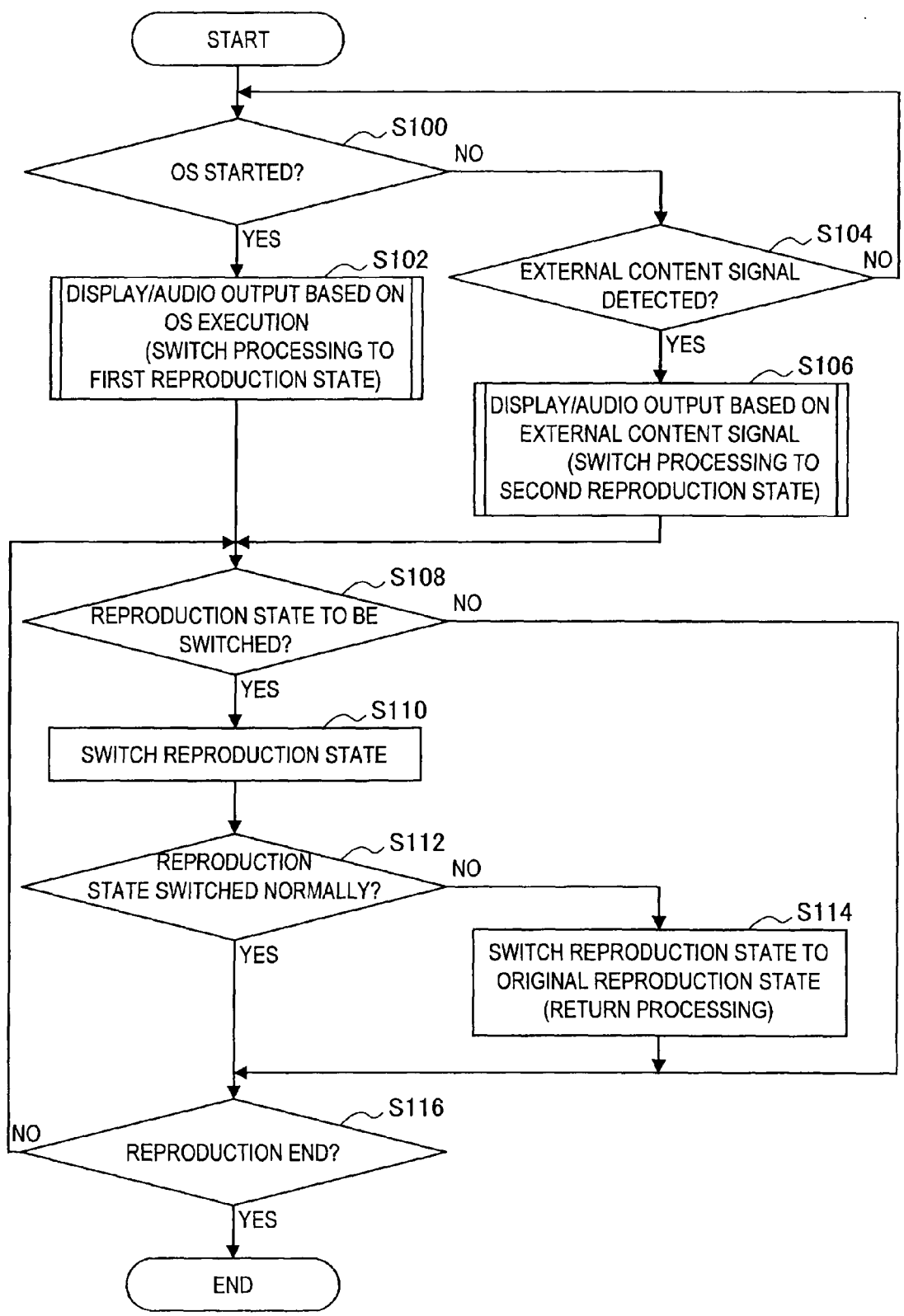
FIG. 3 is a flowchart showing an example of processing related to switching of reproduction state in an information processing apparatus according to an embodiment of the present invention.

Processing in the information processing apparatus 100 related to the approach to improve user-friendliness described in the above [2] is described hereinafter specifically. FIG. 3 is a flowchart showing an example of processing related to switching of the reproduction state in the information processing system 100 according to the embodiment of the present invention. FIG. 3 shows an example of processing when the current reproduction state of the information processing apparatus 100 is the reproduction standby state.

The information processing apparatus 100 determines whether the OS is activated or not (S100). The information processing apparatus 100 can perform determination of the step S100 based on the activation signal that is generated based on the execution of the OS, for example. The processing of the step S100 corresponds to the processing of determining whether reproduction in the first reproduction state is possible.

If it is determined in the step S100 that the OS is not activated, the information processing apparatus 100 further determines whether the external content signal is detected (S104). The information processing apparatus 100 can perform determination of the step S104 by the detection signal (detection result) based on detection of the external content signal, for example. The processing of the step S104 corresponds to the processing of determining whether reproduction in the second reproduction state is possible.

In the case where the information processing apparatus 100 and the content signal transmitting apparatus 200 are connected by the HDMI, the information processing apparatus 100 detects input of the external content signal based on a change in clock of a clock signal in TMDS, for example. In the TMDS, a plurality of (red, blue and green) color signals and a clock signal for synchronizing the plurality of color signals are transmitted as link. Thus, if a change in clock of the clock signal (change from a reference state when the external content signal is not input) is detected, it is regarded that the plurality of color signals are also detected. Accordingly, the information processing apparatus 100 can detect the external content signal by detecting a change in clock of the clock signal.

A method of detecting the external content signal in the information processing apparatus 100 according to an embodiment of the present invention is not limited to the above method. For example, in the case where the external content signal is transmitted through communication interfaces that respectively transmit the video signal and the audio signal, the information processing apparatus 100 may detect the external content signal based on a change in the signal level of a terminal to which each signal is input.

If it is determined in the step S104 that the external content signal is not detected, the information processing apparatus 100 repeats processing from the step S100. Although FIG. 3 shows the case where the processing of the step S100 is performed before the step S104, the present invention is not limited thereto. For example, the information processing apparatus 100 may perform the processing of the step S104 before the step S101. In this case, a priority of reproduction in the second reproduction state is higher than that of reproduction in the first reproduction state.

{When it is Determined that OS is Activated}

If it is determined in the step S100 that the OS is activated, the information processing apparatus 100 performs display/audio output based on the execution of the OS, i.e. reproduction of the first video signal and the first audio signal (S102; switch processing to the first reproduction state).

<Outline of Switch Processing to the First Reproduction State>

Figure 4:
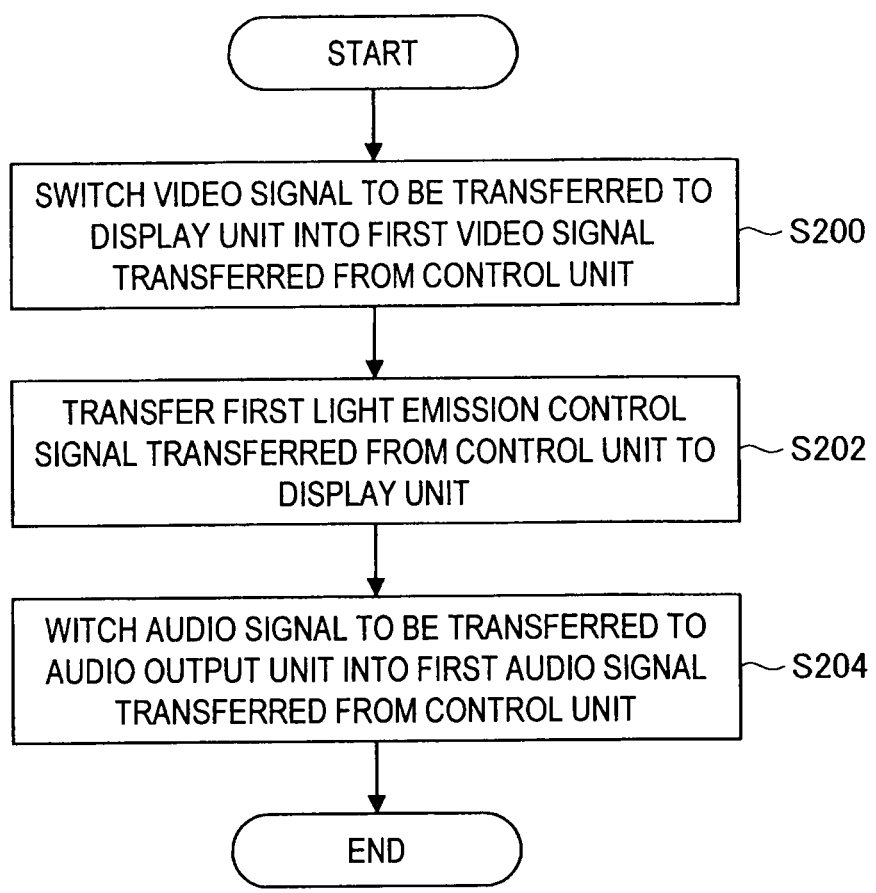
FIG. 4 is a flowchart showing an example of switch processing to a first reproduction state according to an embodiment of the present invention.

The outline of the processing in the step S102, which is switch processing to the first reproduction state, is described hereinafter. FIG. 4 is a flowchart showing an example of switch processing to the first reproduction state according to an embodiment of the present invention. FIG. 4 shows the outline of switch processing in the information processing apparatus 100 shown in FIGS. 6 and 7 described later, and it corresponds to processing performed in a reproduction state switch control unit 106, which is described later.

The information processing apparatus 100 switches the video signal to be transferred to a display unit 108 into the first video signal that is transferred from a control unit 102 (S200). The information processing apparatus 100 thereby allows the video according to the first video signal to be displayed on a display screen of the display unit 108.

Next, the information processing apparatus 100 transfers a first light emission control signal that is transferred from the control unit 102 to the display unit 108 (S202). The light emission control signal in the embodiment of the present invention is a control signal for controlling each pixel of a display device constituting the display unit 108 to selectively emit light. Thus, the first light emission control signal that is transferred to the display unit 108 in the step S202 is a signal for displaying the video according to the first video signal related to a first display state on the display screen of the display unit 108.

Then, the information processing apparatus 100 switches the audio signal to be transferred to an audio output unit 110 into the first audio signal that is transferred from the control unit 102 (S204). The information processing apparatus 100 thereby allows the sound according to the first audio signal to be output from the audio output unit 110.

Although FIG. 4 shows the case where the processing of the steps S202 and S204 are performed after the processing of the step S200, the processing of the steps S200 to S204 may be performed independently of one another. Thus, the information processing apparatus 100 may arbitrarily change the order of performing the processing of the steps S200 to S204 or may perform the processing of the steps S200 to S204 in synchronization with one another, for example.

The information processing apparatus 100 implements the first reproduction state by the processing shown in FIG. 4, for example. The detailed operation and configuration of the information processing apparatus 100 in each processing of FIG. 4 are described later.

Referring again to FIG. 3, processing related to switching of the reproduction state in the information processing apparatus 100 is described hereinafter.

{When it is Determined that the External Content Signal is Detected}

If it is determined in the step S104 that the external content signal is detected, the information processing apparatus 100 performs display/audio output based on the external content signal, i.e. reproduction of the second video signal and the second audio signal (S106; switch processing to the second reproduction state).

<Outline of Switch Processing to the Second Reproduction State>

Figure 5:
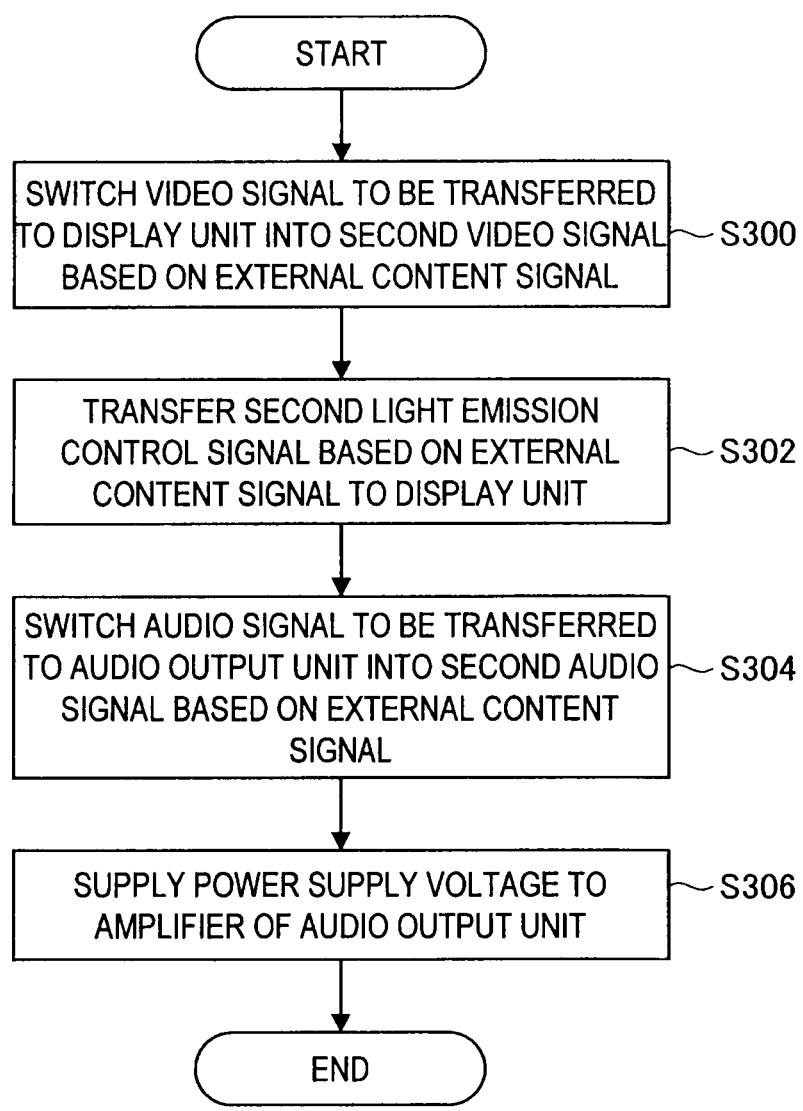
FIG. 5 is a flowchart showing an example of switch processing to a second reproduction state according to an embodiment of the present invention.

The outline of the processing in the step S106, which is switch processing to the second reproduction state, is described hereinafter. FIG. 5 is a flowchart showing an example of switch processing to the second reproduction state according to an embodiment of the present invention. FIG. 5 shows the outline of switch processing in the information processing apparatus 100 shown in FIGS. 6 and 7 described later, and it corresponds to processing performed in the reproduction state switch control unit 106, which is described later, as in the switch processing to the first reproduction state shown in FIG. 4.

The information processing apparatus 100 switches the video signal to be transferred to the display unit 108 into the second video signal based on the external content signal (S300). The information processing apparatus 100 thereby allows the video according to the second video signal to be displayed on the display screen of the display unit 108.

Next, the information processing apparatus 100 transfers a second light emission control signal based on the external content signal to the display unit 108 (S302). The second light emission control signal is a signal for displaying the video according to the second video signal related to a second display state on the display screen of the display unit 108. In the information processing apparatus 100, the reproduction state switch control unit 106 generates the second light emission control signal based on input of the second video signal contained in the external content signal, for example.

Then, the information processing apparatus 100 switches the audio signal to be transferred to the audio output unit 110 into the second audio signal based on the external content signal (S304). The information processing apparatus 100 thereby allows the sound according to the second audio signal to be output from the audio output unit 110.

The information processing apparatus 100 supplies a power supply voltage to an amplifier that is included in the audio output unit 110 (S306). The information processing apparatus 100 implements the second reproduction state without depending on the execution state of the OS. Thus, the OS is not always executed during the second reproduction state in the information processing apparatus 100. Therefore, the information processing apparatus 100 performs processing for supplying a power supply voltage to the amplifier included in the audio output unit 110 when performing reproduction in the second reproduction state. The information processing apparatus 100 thereby allows the sound according to an audio signal that is generated by amplifying the second audio signal to be output from the audio output unit 110. An exemplary configuration of the information processing apparatus 100 for implementing the step S306 is described later.

Although FIG. 5 shows the case where the processing of the steps S302, S304 and S306 are performed after the processing of the step S300, the processing of the steps S300 to S306 may be performed independently of one another. Thus, the information processing apparatus 100 may arbitrarily change the order of performing the processing of the steps S300 to S306 or may perform the processing of the steps S300 to S306 in synchronization with one another, for example.

The information processing apparatus 100 implements the second reproduction state by the processing shown in FIG. 5, for example. The configuration of the information processing apparatus 100 for achieving each processing of FIG. 5 is described later.

Referring again to FIG. 3, processing related to switching of the reproduction state in the information processing apparatus 100 is described hereinafter. After the state transitions from the reproduction standby state to the first reproduction state or the second reproduction state in the step S102 or the step S106, the information processing apparatus 100 determines whether to switch the reproduction state (S108). The information processing apparatus 100 may perform the processing of the step S108 based on a change in state from the first reproduction state or the second reproduction state (processing of the above (1-2) and (1-3)) or the switch signal (processing of the above (1-4)), for example.

If it is determined in the step S108 that the reproduction state is not to be switched, the information processing apparatus 100 determines whether to end the reproduction of the video and the sound (S116). In this step, the information processing apparatus 100 may determine the end of the reproduction of the video and the sound when the first video signal and the detection signal are not detected during the prescribed wait time, for example, although not limited thereto.

If it is determined in the step S116 that the reproduction of the video and the sound does not end, the information processing apparatus 100 repeats the processing from the step S108. On the other hand, if it is determined in the step S116 that the reproduction of the video and the sound ends, the information processing apparatus 100 ends the reproduction of the video and the sound. The reproduction state in the information processing apparatus 100 thereby transitions to the reproduction standby state.

If it is determined in the step S108 that the reproduction state is to be switched, the information processing apparatus 100 switches the reproduction state (S110). The information processing apparatus 100 may switch between the first reproduction state and the second reproduction state by performing the above-described switch processing shown in FIG. 4 or 5.

After switching of the reproduction state is performed in the step S110, the information processing apparatus 100 determines whether switching of the reproduction state has been performed normally (S112). In this step, the information processing apparatus 100 may determine that switching of the reproduction state has not been performed normally if the first video signal or the detection signal is not detected during the prescribed wait time after switching of the reproduction state, for example, although not limited thereto.

If it is determined in the step S112 that switching of the reproduction state has been performed normally, the information processing apparatus 100 determines whether to end the reproduction of the video and the sound (S116).

If it is determined in the step S112 that switching of the reproduction state has not been performed normally, the information processing apparatus 100 switches the reproduction state to the original reproduction state (S114, return processing). Then, the information processing apparatus 100 determines whether to end the reproduction of the video and the sound (S16).

By performing the processing shown in FIGS. 3 to 5, the information processing apparatus 100 can make transition of the reproduction state based on the activation signal, the detection signal (detection result) based on input of the external content signal, the first video signal and the switch signal. The information processing apparatus 100 can thereby reproduce the video and the sound indicated by the external content signal (or implement the second reproduction state) without depending on the execution state of the OS by performing the processing shown in FIGS. 3 to 5, and it is thus possible to improve user-friendliness.

(Information Processing Apparatus 100 According to an Embodiment of the Present Invention)

The information processing apparatus 100 according to an embodiment of the present invention enables improvement of user-friendliness by the above-described approach. The configuration of the information processing apparatus 10 capable of realizing the above-described approach is described hereinbelow.

Figure 6:
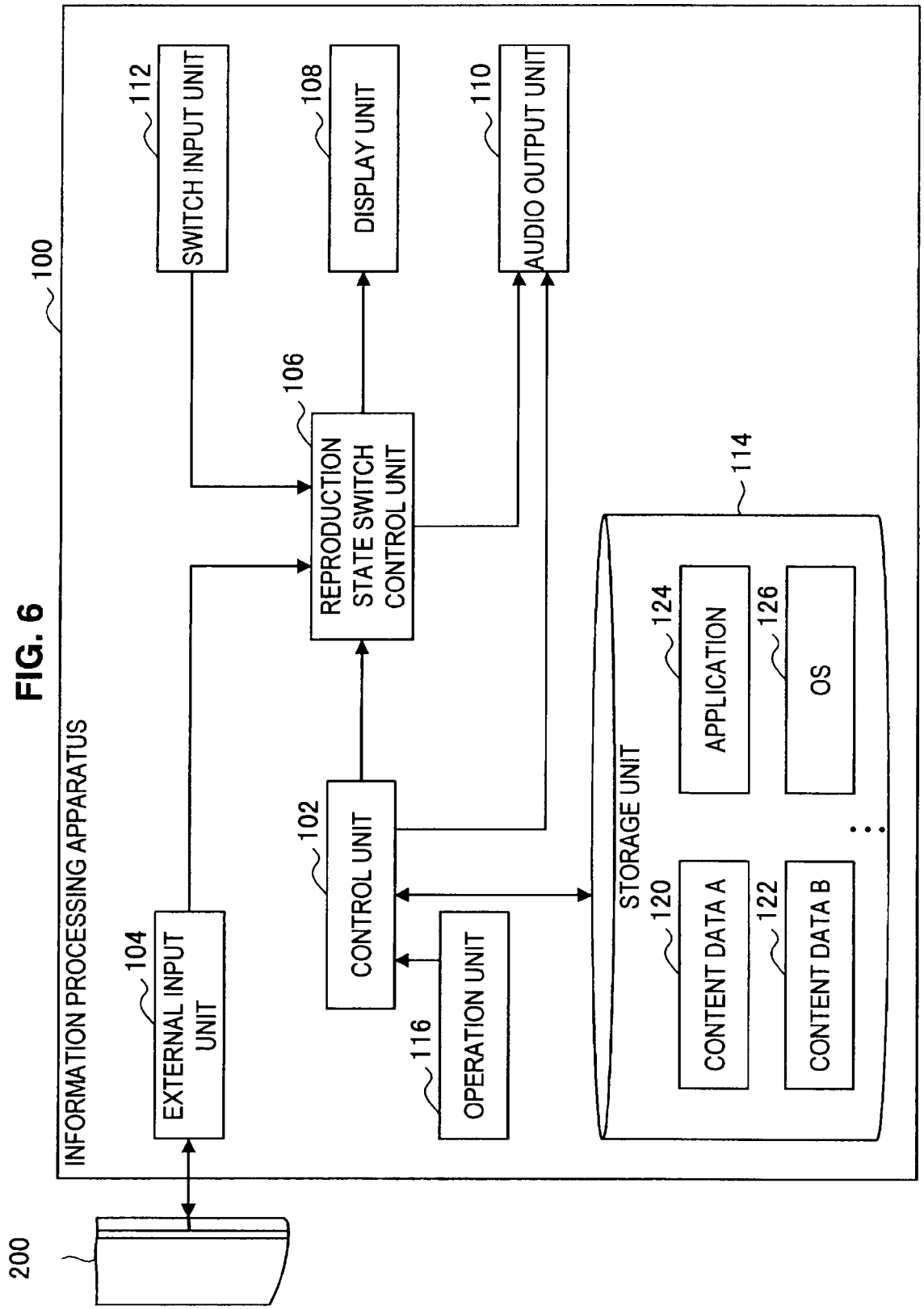
FIG. 6 is an explanatory view showing an example of the configuration of an information processing apparatus according to an embodiment of the present invention.

FIG. 6 is an explanatory view showing an example of the configuration of the information processing apparatus 100 according to the embodiment of the present invention. FIG. 6 also shows the content signal transmitting apparatus 200 that constitutes the information processing system 1000.

Referring to FIG. 6, the information processing apparatus 100 includes the control unit 102, an external input unit 104, the reproduction state switch control unit 106, the display unit 108, the audio output unit 110, the switch input unit 112, a storage unit 114 and an operation unit 116. Further, the information processing apparatus 100 may include a power supply that supplies a power supply voltage for driving the respective elements or the like, although not shown in FIG. 6.

The information processing apparatus 100 may further include ROM (Read Only Memory; not shown), RAM (Random Access Memory; not shown), a communication unit (not shown) or the like. In the information processing apparatus 100, the respective elements may be connected through a bus, which is a data transmission line, for example. The ROM stores programs to be used by the control unit 102 and control data such as calculation parameters. The RAM primarily stores programs to be executed by the control unit 102 or the like. The communication unit (not shown) has a function of performing wired/wireless communication with an external apparatus via a network (or directly). The network may be a wired network such as LAN (Local Area Network) or WAN (Wide Area Network), a wireless network via a base station such as a wireless WAN (WWAN; Wireless Wide Area Network) or a wireless MAN (WMAN; Wireless Metropolitan Area Network), Internet using a communication protocol such as TCP/IP (Transmission Control Protocol/Internet Protocol) or the like, for example, although not limited thereto. Further, the communication unit (not shown) may be a communication antenna and an RF circuit (wireless communication), an IEEE 802.15.1 port and a transmitting and receiving circuit (wireless communication), an IEEE 802.11b port and a transmitting and receiving circuit (wireless communication), a LAN terminal and a transmitting and receiving circuit (wired communication) or the like, for example, although not limited thereto.

The control unit 102 is composed of an MPU (Micro Processing Unit), a chipset or the like, for example, and controls the information processing apparatus 100 as a whole. Further, the control unit 102 executes basic software such as OS or BIOS, and also executes various kinds of applications (application programs) on the OS. Thus, the control unit 102 has a function of outputting the first video signal and the first audio signal based on the execution of basic software such as the OS in the information processing apparatus 100. Furthermore, the control unit 102 generates the activation signal upon activation of the OS and transfers it to the reproduction state switch control unit 106.

Further, the control unit 102 transfers the first video signal to the reproduction state switch control unit 106 and transfers the first audio signal to the audio output unit 110. In addition, the control unit 102 outputs the first light emission control signal in synchronization with output of the first video signal. The information processing apparatus 100 according to an embodiment of the present invention is not limited thereto, and the control unit 102 may transfer the first video signal and the first audio signal to the reproduction state switch control unit 106, and the reproduction state switch control unit 106 may transfer the first audio signal to the audio output unit 110.

The external input unit 104 is connected to the external apparatus such as the content signal transmitting apparatus 200, and the external content signal transmitted from the external apparatus is input to the external input unit 104. The external input unit 104 may be an HDMI terminal, for example, though not limited thereto. The external content signal that is input to the external input unit 104 is transferred to the reproduction state switch control unit 106.

The reproduction state switch control unit 106 has a function of selectively switching the reproduction state by performing the above processing (1) (processing of determining change in reproduction state) and the processing (2) (processing of switching reproduction state).

Specifically, the reproduction state switch control unit 106 selectively outputs the first video signal that is transferred from the control unit 102 or the second video signal based on the external content signal that is transferred from the external input unit 104 to the display unit 108. Further, when the reproduction state switch control unit 106 outputs the second video signal to the display unit 108, it outputs the second light emission control signal in synchronization with output of the second video signal. Furthermore, the reproduction state switch control unit 106 outputs a light emission selection control signal for selecting a signal to output to a selector (e.g. a selector SEL2, which is described later) that selectively outputs the first light emission control signal or the second light emission control signal. The reproduction state switch control unit 106 can thereby selectively transfer the first light emission control signal or the second light emission control signal according to the video signal to be transferred to the display unit 108.

Further, the reproduction state switch control unit 106 transfers the second audio signal based on the external content signal and an audio switch control signal to the audio output unit 110. The audio switch control signal is a signal for switching the audio signal to be reproduced in the audio output unit 110. The reproduction state switch control unit 106 can control switching of the sound to be output from the audio output unit 110 by transferring the audio switch control signal to the audio output unit 110 in synchronization with the second audio signal.

Although FIG. 6 shows the configuration in which the control unit 102 transfers the first audio signal to the audio output unit 110, the present invention is not limited thereto. For example, in the configuration in which the control unit 102 transfers the first video signal and the first audio signal to the reproduction state switch control unit 106, the reproduction state switch control unit 106 may selectively transfer either one of the first audio signal or the second audio signal to the audio output unit 110. In this configuration also, the reproduction state switch control unit 106 can control switching of the sound to be output from the audio output unit 110.

The display unit 108 is a display means that is included in the information processing apparatus 100. The video signal (first video signal/second video signal) and the light emission control signal (first light emission control signal/second light emission control signal) are transferred to the display unit 108, so that the video according to the transferred video signal is displayed on the display screen.

The display unit 108 may be a display device such as an LCD (Liquid Crystal Display) or an organic EL display (organic ElectroLuminescence display; also called OLED (Organic Light Emitting Diode) display), for example, though not limited thereto. Although the information processing apparatus 100 according to the embodiment of the present invention may have the configuration that includes the display unit 108 inside the apparatus (the configuration in which a display device is integrated), it is not limited thereto. For example, the information processing apparatus 100 may selectively output the first video signal or the second video signal to a display device as an external apparatus rather than including a display device inside.

The audio output unit 110 outputs a sound according to the transferred first audio signal or second audio signal. For example, the audio output unit 110 may be an audio output device that is composed of an audio codec, a DSP (Digital Signal Processor), an amplifier, a speaker or the like, though not limited thereto.

The switch input unit 112 has a function of generating the switch signal and transferring the switch signal to the reproduction state switch control unit 106. Although the switch input unit 112 may be an operation device that can be operated by a user such as a button or a switch, it is not limited thereto. For example, the switch input unit 112 may be composed of a touch screen that enables information display and operation.

The storage unit 114 is an information storage means that is included in the information processing apparatus 100. With the storage unit 114 included, the information processing apparatus 100 can store various data (information) such as OS (basic software), application (application software), content data indicating a video or a sound and reproduction state information indicating the current reproduction state. FIG. 6 shows an example in which the storage unit 114 stores content data A 120, content data B 122, application 124, OS 126 and so on.

The storage unit 114 may be a magnetic recording medium such as hard disk, nonvolatile memory such as EEPROM (Electrically Erasable and Programmable Read Only Memory), flash memory, MRAM (Magnetoresistive Random Access Memory), FeRAM (Ferroelectric Random Access Memory) or PRAM (Phase-change Random Access Memory) or the like, though not limited thereto.

The operation unit 116 is an operating means that enables operation by a user that is included in the information processing apparatus 100. With the operation unit 116 included, the information processing apparatus 100 can perform processing desired by a user. The operation unit 116 may be an operation input device such as a keyboard or a mouse, a rotating selector such as a button, a direction key or a jog dial, a combination of those or the like, for example, though not limited thereto.

In this configuration, the information processing apparatus 100 can realize the above-described approach and improve user-friendliness. The configuration of the information processing apparatus 100 that can realize the above-described approach is described hereinafter more specifically with reference to an example of the hardware configuration of the information processing apparatus 100.

[Exemplary Hardware Configuration of the Information Processing Apparatus 100]

FIG. 7 is an explanatory view showing an example of the hardware configuration of the information processing apparatus 100 according to an embodiment of the present invention. In FIG. 7, the illustration of the storage unit 114 and the operation unit 116 is omitted for simplification of explanation. Further, although FIG. 7 illustrates a power supply 134 that supplies a power supply voltage for driving the respective elements, the illustration of power supply voltage lines that supply the power supply voltage to the respective elements is omitted except for a part of them.

Referring to FIG. 7, the information processing apparatus 100 includes a mother board 130, an add-on board 132, and a display device 154 serving as the display unit 108, when divided broadly.

FIG. 7 shows the configuration in which the control unit 102 and the audio output unit 110, which are the elements shown in FIG. 6, are mounted on the mother board 130. Further, FIG. 7 shows the configuration in which the external input unit 104, the reproduction state switch control unit 106 and the switch input unit 112, which are the elements shown in FIG. 6 related to input of the external content signal and switch processing of the reproduction state, are mounted on the add-on board 132. Because the elements related to input of the external content signal and switch processing of the reproduction state are incorporated as the add-on board, it is possible in the information processing apparatus 100 to easily enable or disable the function related to reproduction of the external content signal. For example, in an information processing apparatus that does not include the add-on board 132, the first video signal is directly transferred from a graphic chip 144 shown in FIG. 7 to the display device 154 through a signal line LG1. Further, in an information processing apparatus that does not include the add-on board 132, the first light emission control signal that is output from the graphic chip 144 is transferred to the display device 154 through the signal line LE1 and a selector SEL2 selecting the signal line LE1 side.

Further, because the elements related to input of the external content signal and switch processing of the reproduction state are implemented on the add-on board 132, it is possible to achieve commonality of design between the information processing apparatus 100 having the function related to reproduction of the external content signal and an information processing apparatus not having that function. Alternatively, the elements related to input of the external content signal and switch processing of the reproduction state may be of course mounted on the mother board in the information processing apparatus 100 according to the embodiment of the present invention.

{Mother Board 130}

The mother board 130 includes the control unit 102, the audio output unit 110, the power supply 134, a switching unit 136 and a light emission control signal selection unit 138.

The control unit 102 includes an MPU 140, a chipset 142 and the graphic chip 144.

The chipset 142 outputs the first video signal and the first light emission control signal to the graphic chip 144 and outputs the first audio signal to an audio codec 156 based on a processing result of the MPU 140 or a processing result of a processing circuit included in the chipset 142. The graphic chip 144 outputs the first video signal by decoding various kinds of data stored in the storage unit 114 based on an instruction transferred from the chipset 142, for example, and further outputs the first light emission control signal in synchronization with the first video signal. Although FIG. 7 shows the configuration in which the audio output unit 110 includes the audio codec 156, it is not limited thereto, and the control unit 102 may include the audio codec 156.

When the chipset 142 outputs the first audio signal to the audio codec 156, it transfers a second power supply signal to the switching unit 136 through a signal line LS5. The second power supply signal is a signal for transferring a power supply voltage POWER2 that is supplied from the power supply 134 to an amplifier of an audio output device 160.

Further, the chipset 142 transfers the activation signal that is generated by the MPU 140 upon activation of the OS to a switch control unit 150 of the reproduction state switch control unit 106 through a signal line L1.

In this configuration, the control unit 102 can selectively output the first video signal and the first audio signal.

The audio output unit 110 includes the audio codec 156, a DSP 158 and the audio output device 160.

The audio codec 156 performs decoding, data format conversion or the like of data corresponding to the first video signal stored in the storage unit 114, for example, based on an instruction transferred from the chipset 142, and outputs the first audio signal. The audio codec 156 may be implemented by hardware or may be implemented by software. In the case where the audio codec 156 is implemented by software, it is executed by the MPU 140, the DSP 158 or the like, for example.

The DSP 158 selectively transfers the transferred first audio signal or second audio signal to the audio output device 160 based on the audio switch control signal transferred through a signal line LS2. Further, the DSP 158 can perform various kinds of processing such as effect processing and noise removal on the audio signal to be output.

The audio output device 160 outputs the sound based on the audio signal when the audio signal is transferred from the DSP 158. The audio output device 160 includes an amplifier, a speaker, an earphone jack to which an earphone as an external apparatus is connectable or the like. In FIG. 7, the power supply voltage POWER2 that is output from the power supply 134 is supplied to the audio output device 160, which means supply of the power supply voltage to the amplifier. As mentioned earlier, supply of the power supply voltage to the other elements is not illustrated in FIG. 7.

The power supply 134 is a power supply means that is included in the information processing apparatus 100, and it has a function of supplying a drive voltage for driving the respective elements. Although FIG. 7 shows the configuration in which the information processing apparatus 100 includes the power supply 134 on the mother board 130, it is not limited thereto.

The switching unit 136 is placed to supply the power supply voltage POWER2 to be transferred to the amplifier of the audio output device 160 during the second reproduction state without depending on the execution state of the OS. The switching unit 136 includes an OR-circuit and a switching element SW1. When at least one of the second power supply signal transferred through the signal line LS5 and a first power supply signal transferred through a signal line LS4 is input, the OR-circuit outputs a power supply signal for selectively transferring the power supply voltage POWER2 to the amplifier of the audio output device 160. In response to the power supply signal that is output from the OR-circuit, the switching element SW1 selectively transfers the power supply voltage POWER2 to the amplifier of the audio output device 160. The switching element SW1 may be an n-channel MOSFET (Metal-Oxide-Semiconductor Field-Effect Transistor), for example, although not limited thereto. In this case, the signal level of the power supply signal for transferring the power supply voltage POWER2 to the amplifier of the audio output device 160 that is output from the OR-circuit is High level. Further, in this case, when at least one of the second power supply signal transferred through the signal line LS5 and the first power supply signal transferred through the signal line LS4 is High level, the switching unit 136 transfers the power supply voltage POWER2 to the amplifier of the audio output device 160.

In this configuration, the switching unit 136 can supply the power supply voltage POWER2 to be transferred to the amplifier of the audio output device 160 without depending on the execution state of the OS in the second reproduction state. Thus, the information processing apparatus 100 can output the sound based on the second audio signal from the audio output unit 110 without depending on the execution state of the OS during the second reproduction state.

The light emission control signal selection unit 138 includes a selector SEL2 and selectively outputs the first light emission control signal transferred through a signal line LE1 or the second light emission control signal transferred through a signal line LE2 to the display device 154 based on the light emission selection control signal transferred through a signal line LS3.

{Add-On Board 132}

The add-on board 132 includes an external input terminal 146 that serves as the external input unit 104, the reproduction state switch control unit 106, and a changeover switch 162 that serves as the switch input unit 112.

The external input terminal 146 receives the external content signal that is transmitted from the external apparatus such as the content signal transmitting apparatus 200. Although the external input terminal 146 may be an HDMI terminal, for example, it is not limited thereto. For example, the external input terminal 146 may include a D-terminal to which a video signal (third video signal) is input and an optical digital audio terminal to which an audio signal (third audio signal) is input, for example. In this case, a reproduction state when the third video signal and the third audio signal are reproduced can be regarded as being a third reproduction state corresponding to the second reproduction state.

The reproduction state switch control unit 106 includes a receiver 148 (external content signal detection unit), the switch control unit 150 and a video signal selection unit 152. The reproduction state switch control unit 106 may further include a first video signal detection unit (not shown) that detects the first video signal transferred through the signal line LG1 and transfers a detection result to the switch control unit 150.

The receiver 148 outputs the second video signal based on the external content signal received by the external input terminal 146 through a signal line LG2 and outputs the second audio signal based on the external content signal through a signal line LA1.

Further, the receiver 148 detects input of the external content signal and transfers a detection signal (detection result) based on input of the external content signal to the switch control unit 150 through a signal line L2. The receiver 148 may detect input of the external content signal based on a change in clock of the clock signal in the TMDS, for example, although not limited thereto. Further, although the receiver 148 outputs a one-bit signal indicating whether the external content signal is input as the detection signal, for example, it is not limited thereto. For example, the receiver 148 may output the second video signal itself based on the external content signal as the detection signal. The receiver 148 may be an HDMI receiver, for example, although not limited thereto.

The switch control unit 150 makes transition of the reproduction state by the following processing <a> to <d>, for example, based on the reproduction state information indicating the current reproduction state and various kinds of signals transferred through the respective signal lines, for example. If the reproduction state has transitioned, the switch control unit 150 updates the reproduction state information, for example. The various kinds of signals may include the activation signal transferred through the signal line L1, the detection signal transferred through the signal line L2, the switch signal transferred through the signal line L3 and the detection signal (not shown) of the first video signal transferred through the signal line LG1, for example.

<a> Transition from the Reproduction Standby State to the First Reproduction State If the activation signal is transferred during the reproduction standby state, the switch control unit 150 transfers through a signal line LS1 a video signal switch control signal for causing a selector SEL1 included in the video signal selection unit 152 to selectively output the first video signal. In response to the transfer of the video signal switch control signal, the selector SEL1 outputs the first video signal that is transferred through the signal line LG1.

The switch control unit 150 further transfers through the signal line LS2 the audio switch control signal for causing the DSP 158 included in the audio output unit 110 to selectively output the first audio signal. In response to the transfer of the audio switch control signal signal, the DSP 158 outputs the first audio signal transferred from the audio codec 156.

Further, the switch control unit 150 transfers through the signal line LS3 the light emission selection control signal for causing the selector SEL2 included in the light emission control signal selection unit 138 to selectively output the first light emission control signal. In response to the transfer of the light emission selection control signal, the light emission control signal selection unit 138 outputs the first light emission control signal transferred through the signal line LE1.

As a result that the switch control unit 150 performs the above processing, the first video signal and the first light emission control signal are transferred to the display device 154, and therefore the video based on the first video signal is displayed on the display device 154, and further the sound based on the first audio signal is output from the audio output unit 110. Therefore, the reproduction state of the information processing apparatus 100 transitions from the reproduction standby state to the first reproduction state.

<b> Transition from the Reproduction Standby State to the Second Reproduction State If the detection signal is transferred during the reproduction standby state, the switch control unit 150 transfers through the signal line LS1 the video signal switch control signal for causing the selector SEL1 included in the video signal selection unit 152 to selectively output the second video signal. In response to the transfer of the video signal switch control signal, the selector SEL1 outputs the second video signal that is transferred through the signal line LG2.

The switch control unit 150 further transfers through the signal line LS2 the audio switch control signal for causing the DSP 158 included in the audio output unit 110 to selectively output the second audio signal. In response to the transfer of the audio switch control signal, the DSP 158 outputs the second audio signal transferred from a signal line LA2.

Further, the switch control unit 150 transfers the second light emission control signal through the signal line LE2 to the selector SEL2 included in the light emission control signal selection unit 138. Then, the switch control unit 150 transfers through the signal line LS3 the light emission selection control signal for causing the selector SEL2 included in the light emission control signal selection unit 138 to selectively output the second light emission control signal. In response to the transfer of the light emission selection control signal, the light emission control signal selection unit 138 outputs the second light emission control signal transferred through the signal line LE2.

Furthermore, the switch control unit 150 transfers the first power supply signal to the OR-circuit of the switching unit 136 through the signal line LS4 in order to selectively transfer the power supply voltage POWER2 to the amplifier of the audio output device 160. In response to the transfer of the first power supply signal, the switching unit 136 transfers the power supply voltage POWER2 to the amplifier of the audio output device 160 without depending on the execution state of the OS.

As a result that the switch control unit 150 performs the above processing, the second video signal and the second light emission control signal are transferred to the display device 154, and therefore the video based on the second video signal is displayed on the display device 154, and further the sound based on the second audio signal is output from the audio output unit 110. Therefore, by performing the above processing in the switch control unit 150, the second reproduction state is implemented in the information processing apparatus 100 without depending on the execution state of the OS. The information processing apparatus 100 can thereby make transition from the reproduction standby state to the second reproduction state without depending on the execution state of the OS, and it is thereby possible to improve user-friendliness.

<C> Transition Between the First Reproduction State and the Second Reproduction State If the switch signal is detected during the first reproduction state or the second reproduction state, the switch control unit 150 outputs the video signal switch control signal, the audio switch control signal, the second light emission control signal and the first power supply signal to the corresponding signal lines according to the current reproduction state and the reproduction state after transition. As a result that the switch control unit 150 performs the above processing, the information processing apparatus 100 can implement the first reproduction state or the second reproduction state by the same operation as the above <a> and <b>. The information processing apparatus 100 can thereby make transition of the reproduction state between the first reproduction state and the second reproduction state.

<d> Transition from the First Reproduction State/the Second Reproduction State to the Standby State If the video signal (first video signal or second video signal) ceases to be input during the first reproduction state or the second reproduction state, the switch control unit 150 waits for a prescribed wait time. Then, if input of the video signal is not detected after a lapse of the prescribed wait time, the switch control unit 150 performs processing of making transition to the reproduction standby state. The processing of making transition to the reproduction standby state in the switch control unit 150 may setting the selection position of the selector SEL1 and the selector SEL2 to a predetermined wait position, for example, although not limited thereto.

As a result that the switch control unit 150 performs the above processing <a> to <d>, transition of the reproduction state shown in FIG. 2 is implemented. Thus, the switch control unit 150 has a function that substantially performs the above processing (1) (processing of determining change in reproduction state) and the processing (2) (processing of switching reproduction state) in the reproduction state switch control unit 106. Therefore, the switch control unit 150 serves as a state change determination unit that determines a change in reproduction state and a reproduction processing switching unit that selectively switches between the first reproduction state and the second reproduction state.

The video signal selection unit 152 includes the selector SEL1 and selectively outputs the first video signal or the second video signal based on the video signal switch control signal that is transferred from the switch control unit 150 through the signal line LS1.

In this configuration, the reproduction state switch control unit 106 can implement the above processing (1) (processing of determining change in reproduction state) and the processing (2) (processing of switching reproduction state).

The changeover switch 162 is an operation input device that can be operated by a user, and transfers the switch signal to the switch control unit 150 through the signal line L3. The changeover switch 162 may be a push button switch, a touch sensor or the like, for example, though not limited thereto.

The information processing apparatus 100 realizes the above-described approach by the hardware configuration shown in FIG. 7, for example. The hardware configuration of the information processing apparatus 100 according to an embodiment of the present invention, however, is not limited to the configuration shown in FIG. 7.

As described in the foregoing, the information processing apparatus 100 according to an embodiment of the present invention includes the reproduction state switch control unit 106 and performs the above processing (1) (processing of determining change in reproduction state) and the processing (2) (processing of switching reproduction state), thereby selectively switching the reproduction state. For example, when making transition from the reproduction standby state to the second reproduction state, the information processing apparatus 100 switches the video displayed on the display screen of the display unit 108 and the sound output from the audio output unit 110 to the second video signal and the second audio signal based on the external content signal. At this time, switch processing to the second reproduction state in the information processing apparatus 100 is performed by the reproduction state switch control unit 106 in response to input of the external content signal without depending on the execution state of the OS. Therefore, a user of the information processing apparatus 100 can enjoy the video and the sound according to the external content signal with use of the information processing apparatus 100 by transmitting the external content signal from the external apparatus such as the content signal transmitting apparatus 200. The information processing apparatus 100 can thereby reproduce the video and the sound indicated by the external content signal (or implement the second reproduction state) without depending on the execution state of the OS, and it is thus possible to improve user-friendliness.

Further, because the reproduction state switch control unit 106 controls switching of the reproduction state in the information processing apparatus 100, it is possible to display the video according to the external content signal in response to input of the external content signal without having the power supply switch for the display device 154, for example. It is thereby not necessary for the information processing apparatus 100 to include both a switch for activating an OS (e.g. a power supply switch of a PC) and a power supply switch for the display device 154, thus preventing a decrease in user-friendliness due to the necessity of a plurality of power supply buttons. Further, in the above configuration, it is possible to reduce power consumption in the information processing apparatus 100.

Further, because the information processing apparatus 100 selectively switches the reproduction state by performing the above processing (1) (processing of determining change in reproduction state) and the processing (2) (processing of switching reproduction state), it is not necessary to perform communication with the content signal transmitting apparatus 200 in order to switch the reproduction state. Therefore, in the information processing system 1000 that includes the information processing apparatus 100, it is not necessary that the apparatus constituting the information processing system has a particular function such as communication through the CEC line, unlike the information processing system that includes the information processing apparatus according to related art. The information processing apparatus 100 thereby enables interaction between apparatus that are connected by a general-purpose interface compared to the information processing apparatus according to related art.

Although the information processing apparatus 100 is described in the foregoing as an element that constitutes the information processing system 1000 according to an embodiment of the present invention, the embodiment of the present invention is not limited thereto. The embodiment of the present invention may be applied to various kinds of equipment including computers such as all-in-one PC and notebook PC including a PC and a display device, portable communication apparatus such as cellular phones and PHS (Personal Handyphone System), video/music playback apparatus such as WALK MAN (registered trademark), portable game machines such as Playstation Portable (registered trademark), navigation apparatus such as car navigation apparatus and so on.

Program Related to the Information Processing Apparatus According to an Embodiment of the Present Invention With use of a program that causes a computer to function as the information processing apparatus 100 according to an embodiment of the present invention, it is possible to reproduce the video and the sound indicated by the signal transmitted from the external apparatus without depending on the execution state of the OS, which improves user-friendliness.

It should be understood by those skilled in the art that various modifications, combinations, sub-combinations and alterations may occur depending on design requirements and other factors insofar as they are within the scope of the appended claims or the equivalents thereof.

For example, although the case of providing a program (computer program) that causes a computer to function as the information processing apparatus 100 according to an embodiment of the present invention is described above, the embodiment of the present invention may further provide a storage medium that stores each of the above programs.

The above-described configuration shows an example of an embodiment of the present invention, which is intended for inclusion within the scope of the present invention.

The present application contains subject matter related to that disclosed in Japanese Priority Patent Application JP 2008-224001 filed in the Japan Patent Office on Sep. 1, 2008, the entire content of which is hereby incorporated by reference.

What is claimed is:

1. An information processing apparatus comprising:
   a control unit to execute an operating system and selectively output a first video signal and a first audio signal based on the execution of the operating system;
   an external input unit to which an external content signal including a second video signal and a second audio signal transmitted from an external apparatus is input; and
   a reproduction state switch control unit to selectively switch between a first reproduction state for reproducing the first video signal and the first audio signal, a second reproduction state for reproducing the second video signal and the second audio signal, and a reproduction standby state in which the operating system is not being executed and the external content signal is not received, wherein
   in response to detecting an input of the external content signal to the external input unit during the reproduction standby state, the reproduction state switch control unit switches from the reproduction standby state to the second reproduction state while the control unit maintains the operating system in an inactive state.

2. The information processing apparatus according to claim 1, wherein:
   the control unit generates an activation signal indicating execution of the operating system upon execution of the operating system, and
   the reproduction state switch control unit includes:
      an external content signal detection unit to detect the external content signal input to the external input unit;
      a state change determination unit to determine a change in the reproduction state based on reproduction state information indicating a current reproduction state, the activation signal, and a detection result indicating whether the external content signal is detected by the external content signal detection unit; and
      a reproduction processing switching unit to selectively switch between the first reproduction state and the second reproduction state based on a determination result of the state change determination unit.

3. The information processing apparatus according to claim 2, wherein the state change determination unit determines a change in the reproduction state based further on the first video signal.

4. The information processing apparatus according to claim 3, wherein:
the second video signal contained in the external content signal includes a plurality of color signals and a clock signal for synchronizing the color signals, and
the external content signal detection unit detects the input of the external content signal based on a change in clock of the clock signal.

5. The information processing apparatus according to claim 2, further comprising:
a switch input unit to generate a switch signal for switching between the first reproduction state and the second reproduction state, wherein
the reproduction processing switching unit switches between the first reproduction state and the second reproduction state based on the switch signal generated by the switch input unit.

6. The information processing apparatus according to claim 1, wherein:
the control unit generates an activation signal indicating the execution of the operating system upon executing the operating system, and
if the activation signal generated by the control unit is detected during the reproduction standby state, the reproduction state switch control unit switches from the reproduction standby state to the first reproduction state.

7. The information processing apparatus according to claim 1, further comprising:
an audio output unit to receive at least one of the first audio signal output from the control unit and the second audio signal contained in the external content signal, and to selectively output a sound indicated by the first audio signal or the second audio signal, wherein
the reproduction state switch control unit outputs an audio switch control signal to the audio output unit upon switching to the second reproduction state, and
the audio output unit outputs the second audio signal when the audio switch control signal is received.

8. The information processing apparatus according to claim 7, wherein:
the audio output unit includes an amplifier to amplify the first audio signal or the second audio signal to be selectively output based on a received power supply voltage,
the information processing apparatus further includes:
a power supply to output the power supply voltage to be supplied to the audio output unit; and
a switching unit to selectively output the power supply voltage to the amplifier based on a first power supply signal received from the reproduction state switch control unit, the power supply signal being output when the reproduction state switch control unit switches to the second reproduction state.

9. The information processing apparatus according to claim 8, wherein:
the control unit outputs a second power supply signal for selectively outputting the amplifier power supply voltage to the switching unit when the operating system is executed, and
the switching unit includes:
an OR-circuit to output a power supply signal having a signal level for selectively transferring the power supply voltage to the amplifier when at least one of the first power supply signal and the second power supply signal is received; and
a switching element to selectively transfer the power supply voltage to the amplifier based on the power supply signal output from the OR-circuit.

10. An information processing apparatus comprising:
a control unit to execute an operating system and selectively output a first video signal and a first audio signal based on the execution of the operating system;
an external input unit to which a third video signal and a third audio signal transmitted from an external apparatus are input; and
a reproduction state switch control unit to selectively switch between a first reproduction state for reproducing the first video signal and the first audio signal, a third reproduction state for reproducing at least one of the third video signal and the third audio signal, and a reproduction standby state in which the operating system is not being executed and the third video signal and the third audio signal are not received, wherein
when an input of the third video signal or the third audio signal to the external input unit is detected during the reproduction standby state, the reproduction state switch control unit switches from the reproduction standby state to the third reproduction state while the control unit maintains the operating system in an inactive state.

11. A non-transitory computer readable medium having instructions stored therein that when executed by a processor causes a computer to perform a method comprising:
detecting, as an external content signal detection result, an external content signal input to an external input unit, the external content signal including a second video signal and a second audio signal;
determining, as a reproduction state determination result, a change in a reproduction state, the reproduction state determination result being based on reproduction state information indicating a current reproduction state, an activation signal transferred from a control unit indicating an execution of an operating system by the control unit, and the external content signal detection result;
selectively switching, based on the reproduction state determination result, between a first reproduction state for reproducing a first video signal and a first audio signal, a second reproduction state for reproducing the second video signal and the second audio signal, and a reproduction standby state in which the activation signal and the external content signal are not received, based on the reproduction state determination result, wherein
when an input of the external content signal to the external input unit is detected during the reproduction standby state, the reproduction state switches from the reproduction standby state to the second reproduction state while the control unit maintains the operating system in an inactive state.

12. The information processing apparatus according to claim 1, wherein the reproduction state switch control unit switches directly from the first reproduction state to the second reproduction state without intermediately transitioning to the reproduction standby state.

13. The information processing apparatus according to claim 1, wherein the operating system provides hardware control for a computer, and an environment for executing software applications on the computer.

* * * * *